(12) United States Patent
White et al.

(10) Patent No.: US 7,032,958 B2
(45) Date of Patent: Apr. 25, 2006

(54) BODY AND FRAME ASSEMBLY FOR A VEHICLE AND METHOD OF ASSEMBLING A VEHICLE

(75) Inventors: Tommy E. White, Rochester Hills, MI (US); Adrian B. Chernoff, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/611,843

(22) Filed: Jul. 1, 2003

(65) Prior Publication Data

US 2005/0001455 A1    Jan. 6, 2005

(51) Int. Cl.
*B62D 25/00* (2006.01)

(52) U.S. Cl. .......................... 296/193.01; 296/193.04; 296/181.1

(58) Field of Classification Search ............ 296/181.1, 296/193.01, 193.04, 203.01, 205, 210
See application file for complete search history.

(56) References Cited

U.S. PATENT DOCUMENTS

| | | | |
|---|---|---|---|
| 3,427,068 A * | 2/1969 | Keahn et al. ............... | 296/210 |
| 5,974,847 A | 11/1999 | Saunders et al. ............... | 72/57 |
| 6,139,094 A | 10/2000 | Teply et al. ............. | 296/203.3 |
| 6,206,458 B1 * | 3/2001 | Schroeder et al. ..... | 296/203.01 |
| 6,253,588 B1 | 7/2001 | Rashid et al. ................... | 72/57 |
| 6,273,498 B1 | 8/2001 | Hillman et al. ........ | 296/203.01 |
| 6,282,790 B1 | 9/2001 | Jackel et al. ................ | 29/897.2 |
| 6,296,301 B1 * | 10/2001 | Schroeder et al. ..... | 296/193.01 |
| 6,347,829 B1 | 2/2002 | Hanyu ......................... | 296/210 |
| 6,412,818 B1 | 7/2002 | Marando .................... | 280/781 |
| 6,457,768 B1 * | 10/2002 | Schroeder et al. ..... | 296/193.01 |
| 6,485,089 B1 * | 11/2002 | Hanyu ......................... | 296/210 |
| 6,533,348 B1 * | 3/2003 | Jaekel et al. ................ | 296/205 |

\* cited by examiner

*Primary Examiner*—Jason Morrow
(74) *Attorney, Agent, or Firm*—Kathryn A. Marra

(57) ABSTRACT

A body and frame assembly for a vehicle includes a one-piece inner member mated with a one-piece outer member, the inner member and the outer member defining door openings at opposing sides of the vehicle. The inner member and the outer member may each include a roof panel portion and two side frame portions. A method of assembling a vehicle that includes the body and frame assembly includes forming each of the inner and outer members by quick plastic forming, super plastic forming or hydroforming. Preferably, the inner member and the outer member are each formed from a separate single sheet of aluminum.

27 Claims, 3 Drawing Sheets

BODY AND FRAME ASSEMBLY FOR A VEHICLE AND METHOD OF ASSEMBLING A VEHICLE

TECHNICAL FIELD

This invention relates to a body and frame assembly for a vehicle.

BACKGROUND OF THE INVENTION

A vehicle side frame and a vehicle roof must be designed to withstand a variety of loads and stresses. The structure and components for a vehicle side frame typically include a left and a right body side frame, a left side center pillar (B pillar) reinforcement, a right side B pillar reinforcement, a left side front hinge pillar reinforcement, a right side front hinge pillar reinforcement, a left side rear hinge pillar reinforcement, a right side rear hinge pillar reinforcement, a left side rocker reinforcement and a right side rocker reinforcement. Furthermore, the structural components of a vehicle roof typically include three separate roof bows and a roof panel.

SUMMARY OF THE INVENTION

A body and frame assembly for a vehicle includes a one-piece inner member mated with a one-piece outer member, the members defining door openings for opposing sides of the vehicle. The inner member and the outer member may be configured to serve as a vehicle roof and as right and left side frames. The inner member may include an inner roof panel portion having opposite ends with a first inner side frame portion at one end and a second inner side frame portion at the opposed end. The inner roof panel portion may be characterized by formations configured to provide structural rigidity. The inner side frame portions extend generally downward from the inner roof panel portion. The outer member may include an outer roof panel portion having opposite ends with a first outer side frame portion at one end and a second outer side frame portion at the opposed end. The outer side frame portions extend generally downward from the outer roof panel portion. The first inner and first outer side frame portions substantially define at least one door opening and the second inner and second outer side frame portions substantially define at least one other door opening. The inner member and the outer member are joined as a body and frame assembly. The inner member and the outer member may be sufficiently contiguous and coextensive with each other such that the outer member substantially covers an outer face of the inner member when the members are joined as a body and frame assembly.

In one aspect of the invention, the inner and outer side frame portions form a door ring having an unbroken ring shape. Each of the inner and outer side frame portions may include a rocker portion and plurality of pillar portions, including an A pillar, a B pillar and a C pillar, the pillar portions being attached at one end to the roof portion and at the other end to the rocker portion. The inner member and the outer member may define holes for door hinges, wiring and trim components.

Preferably, each of the inner member and the outer member are formed from a separate single rigid sheet which may be an aluminum sheet. The inner member and the outer member may be formed by quick plastic forming, super plastic forming or sheet hydroforming. The inner member and the outer member may be joined by hemming, welding or bonding. The body and frame assembly may provide for a reduction in the number of components necessary to provide a functional and structurally viable vehicle roof and side frame, which is desirable for potentially decreasing overall vehicle cost and increasing the efficiency of vehicle assembly. This may be especially beneficial in the ability to produce low cost vehicles that meet the needs of developing world markets.

A method of assembling a vehicle that includes a body and frame assembly is provided. In one aspect of the invention, the method includes forming the inner member by quick plastic forming, super plastic forming or hydroforming. In another aspect of the invention, the method includes forming the outer member by quick plastic forming, super plastic forming or hydroforming. The method may include bending the inner member such that the inner side frame portions extend generally downward from the inner roof panel portion. Bending the outer member such that the outer side frame portions extend generally downward from the outer roof panel portion may also be included. The method may further include mounting the inner and outer members to each other.

The method may include trimming the inner member, trimming the outer member, and modifying each of the inner and outer members such that each defines holes for door hinges, wiring and trim components. Mounting the body and frame assembly to a vehicle chassis may further be included in the method. Providing a body and frame assembly may also be included.

The above features and advantages, and other features and advantages of the present invention are readily apparent from the following detailed description of the best mode for carrying out the invention when taken in connection with the accompanying drawings.

BRIEF DESCRIPTION OF THE DRAWINGS

FIG. 2b is a vertical cross-sectional view of the body and frame assembly and the vehicle chassis frame taken along the line 2b—2b in FIG. 2a.

DESCRIPTION OF THE PREFERRED EMBODIMENT

Figure 1A:
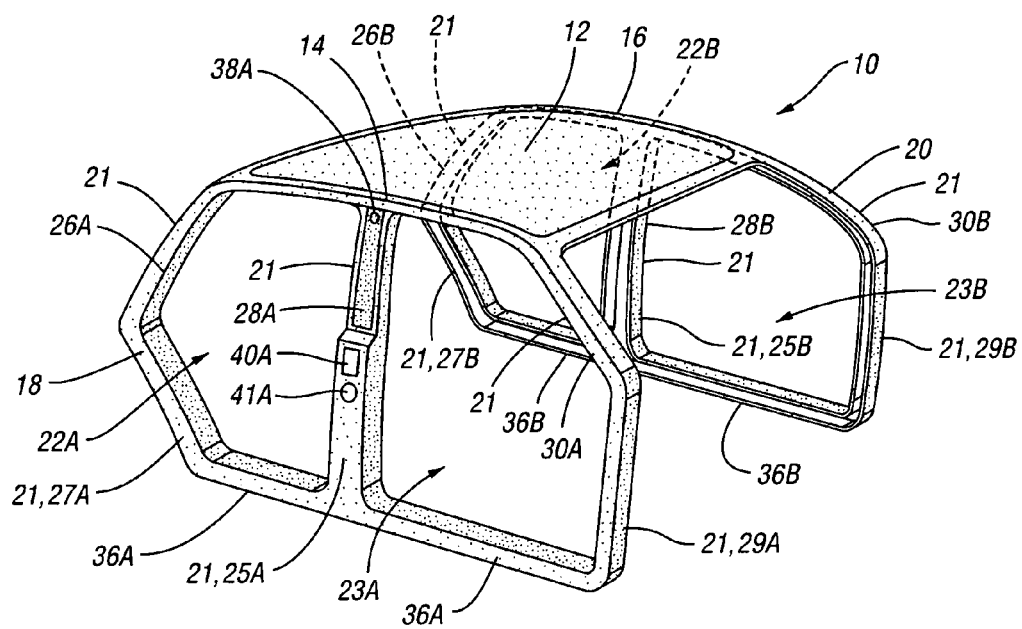
FIG. 1a is a schematic illustration in perspective view of a body and frame assembly outer member in accordance with the invention.

FIG. 1a shows a body and frame assembly outer member 10. The outer member 10 may be one-piece or may be integral. As used herein, "integral" includes structurally joined and removably joined components. The outer member 10 includes an outer roof panel portion 12 having an outer roof panel portion first end 14 and an outer roof panel portion second end 16, the first and second ends 14, 16 being opposite each other. A roof panel is a vehicle body panel commonly disposed at the top of a vehicle above a passenger compartment. The outer roof panel portion 12 may include open spaces configured for roof accessories, such as sunroofs and glass inserts. Such spaces may be formed, stamped or cut, pursuant to the method described below. The outer member 10 includes first outer side frame portion 18 extending from the outer roof portion first end 14. The outer member 10 further includes a second outer side frame portion 20 extending from the outer roof panel portion second end 16. A side frame is a portion of a vehicle body frame disposed on the side of a vehicle, used to provide structural integrity and for mounting vehicle doors or body panels thereto. The first and second outer side frame portions 18, 20 extend generally downward from the outer roof panel portion 12 as depicted in FIG. 1a.

The first outer side frame portion 18 and the second outer side frame portion 20 each include a plurality of outer pillar portions 21. The first outer side frame portion and the second outer side frame portion 18, 20 also each include first and second outer rocker portions 36A, 36B, respectively. The pillar portions 21 include a first outer side frame C pillar 26A, and a second outer side frame C pillar 26B, a first outer side frame B pillar 28A, a second outer side frame B pillar 28B, a first outer side frame A pillar 30A and a second outer side frame A pillar 30B. The pillar portions 21 further include a first outer side frame body lock pillar 27A and a second outer side frame body lock pillar 27B located below and connected to the C pillars 26A, 26B, respectively. The pillar portions 21 further include a first outer side frame rear hinge pillar 25A and a second outer side frame rear hinge pillar 25B located below and connected to the B pillars 28A, 28B, respectively. The pillar portions 21 further include a first outer side frame front hinge pillar 29A and a second outer side frame front hinge pillar 29B located below and connected to the outer side frame A pillars 30A, 30B, respectively. The pillar portions 21 are disposed between and connect the respective outer roof panel portions first and second ends 14, 16 to the respective rocker portions 36A, 36B. The rocker portions 36A, 36B extend from the first and second outer side frame body lock pillars 27A, 27B to the first and second outer side frame front hinge pillars 29A, 29B, respectively.

As depicted in FIG. 1a, the outer pillar portions 21 and first and second outer rocker portions 36A, 36B of the first and second outer side frame portions 18, 20 form a first outer rear door opening 22A, a first outer front door opening 23A, a second outer rear door opening 22B and a second outer front door opening 23B. Additionally, as FIG. 1a shows, the first outer side frame portion 18 forms a door ring having an unbroken ring shape defined by the outer roof panel portion first end 14, the first outer side frame C pillar 26A, the first outer side frame body lock pillar 27A, the first outer rocker portion 36A, the first outer side frame front hinge pillar 33A and the first outer side frame A pillar 30A. Similarly, the second outer side frame portion 20 forms a door ring having an unbroken ring shape defined by the outer roof panel portion second end 16, the second outer side frame C pillar 26B, the second outer side frame body lock pillar 27B, the second outer rocker portion 36B, the second outer side frame front hinge pillar 29B and the second outer side frame A pillar 30B. Each of the door rings described above and shown in FIG. 1a encompass two door openings, the openings being separated by the B pillar portion and rear hinge pillar portion. The invention contemplates a door ring encompassing only one door opening such as for a truck cab.

Additionally, the invention contemplates a door ring as described in FIG. 1a but in which no B pillar and rear hinge pillar are present. In that case, a rear door may be hinged to the C pillar and swing open toward the rear.

The outer member 10 defines a trim component hole 38A. The trim component hole 38A allows a trim component to be mounted to the outer member 10. For example, a B pillar decorative panel may be mounted to the trim component hole 38A. The outer member 10 further defines a door hinge hole 40A, shown on the first outer side frame rear hinge pillar 25A. The door hinge hole 40A is used to mount a rear passenger door to the first outer side frame rear hinge pillar 25A. The outer member 10 further defines a wiring hole 41A used for routing wiring through the first outer side frame rear hinge pillar 25A or mounting a wiring harness thereto. Other locations on the outer member 10 for each of the trim component hole 38A, the door hinge hole 40A and the wiring hole 41A are envisioned within the scope of the invention. The outer member 10 may also define holes to which seat belt system components may be mounted. Such holes would likely be located in the outer pillar portions 21.

Figure 1B:
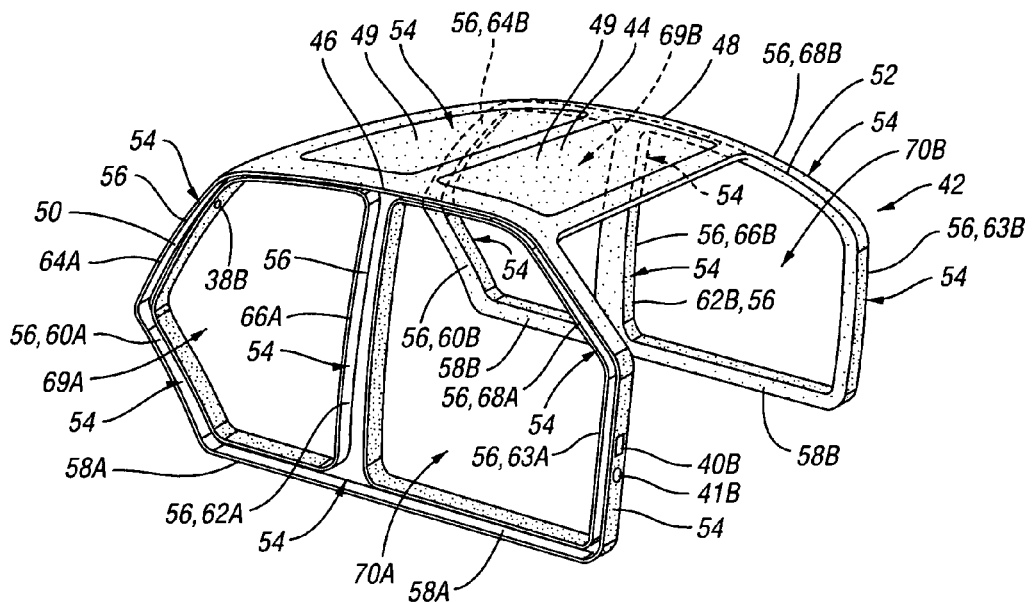
FIG. 1b is a schematic illustration in perspective view of a body and frame assembly inner member in accordance with the invention.

FIG. 1b depicts a body and frame assembly inner member 42. The inner member 42 may be one-piece or may be integral. The inner member 42 includes an inner roof panel portion 44 having an inner roof panel portion first end 46 and an inner roof panel portion second end 48, the first end and the second end 46, 48 being opposite ends of the inner roof panel portion 44. The inner roof panel portion 44 has structural formations 49 to provide additional strength and rigidity. Structural formations 49 may be in a variety of shapes. In FIG. 1b, the structural formations 49 are depicted as generally rectangular depressions in the inner roof panel portion 44. The inner roof panel portion 44 may include open spaces configured for roof accessories, such as sunroofs and glass inserts. Such spaces may be formed, stamped or cut, pursuant to the method described below.

The body and frame assembly inner member 42 further includes a first inner side frame portion 50 and a second inner side frame portion 52. The first inner side frame portion 50 extends downward from the inner roof panel portion first end 46, and the second inner side frame portion 52 extends downward from the inner roof panel portion second end 48. The inner member 42 has an outer face 54 consisting of the surface area on the outwardly facing portions of the inner roof panel portion 44 and the first and second inner side frame portions 50, 52.

The first and second inner side frame portions 50, 52 include inner pillar portions 56. The first and second inner side frame portions 50, 52 further include inner rocker portions 58A, 58B, respectively. The inner pillar portions 56 include a first inner side frame C pillar 64A, a second inner side frame C pillar 64B, a first inner side frame B pillar 66A, a second inner side frame B pillar 66B, a first inner side frame A pillar 68A, and a second inner side frame A pillar 68B. The pillar portions 56 further include a first inner side frame body lock pillar 60A and a second inner side frame body lock pillar 60B located below and connected to the C pillars 64A and 64B, respectively. The pillar portions 56 further include a first inner side frame rear hinge pillar 62A and a second inner side frame rear hinge pillar 62B located below and connected to the B pillars 66A, 66B, respectively. The pillar portions 56 further include a first inner side frame front hinge pillar 63A and a second inner side frame front hinge pillar 63B located below and connected to the inner side frame A pillars 68A, 68B, respectively. The pillar portions 56 are disposed between and connect the respective inner roof panel portions first and second ends 46, 48 to the respective rocker portions 58A, 58B. The rocker portions 58A, 58B extend from the first and second inner side frame body lock pillars 60A, 60B to the first and second inner side frame front hinge pillars 63A, 63B, respectively.

As depicted in FIG. 1b, the inner pillar portion 56 and inner rocker portions 58A, 58B of the first and second inner side frame portions 50, 52 form a first inner rear door opening 69A, a first inner front door opening 70A, a second inner rear door opening 69B and a second inner front door opening 70B. Additionally, as FIG. 1b shows, the first inner side frame portion 50 forms a door ring having an unbroken ring shape defined by the inner roof panel portion first end 46, the first inner side frame C pillar 64A, the first inner side frame body lock pillar 60A, the first inner rocker portion 58A, the first inner side frame front hinge pillar 63A and the first inner side frame A pillar 68A. Similarly, the second inner side frame portion 52 forms a door ring having an unbroken ring shape defined by the inner roof panel portion second end 48, the second inner side frame C pillar 64B, the second inner side frame body lock pillar 60B, the second inner rocker portion 58B, the second inner side frame front hinge pillar 63B and the second inner side frame A pillar 68B. As discussed with respect to the outer member 10 above, the invention contemplates that each door ring may encompass either one or two door openings.

The inner member 42 defines a trim component hole 38B shown in the first inner side frame C pillar 64A. The trim component hole 38B may be used to mount a decorative panel to the inner member 42, such as a C pillar interior decorative panel to a portion of the C pillar 64A. The inner member 42 further defines a door hinge hole 40B, shown on the first inner side frame front hinge pillar 63A. A front passenger door may be mounted to the front hinge pillar 63A at the door hinge hole 40B. The inner member 42 further defines a wiring hole 41B used for routing wiring through the first inner side frame front hinge pillar 63A or mounting a wiring harness thereto. Other locations on the inner member 42 for each of the trim component hole 38B, the door hinge hole 40B and the wiring hole 41B are envisioned within the scope of the invention. The inner member 42 may also define holes to which seat belt system components may be mounted. Such holes would likely be located in the inner pillar portions 56.

Figure 1C:
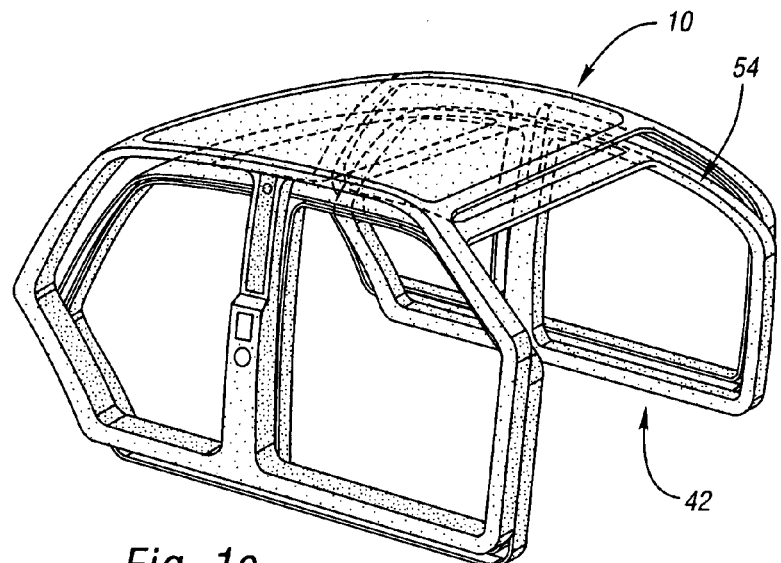
FIG. 1c is a partially exploded schematic illustration in perspective view of the outer member of FIG. 1a being mounted to the inner member of FIG. 1b.

Referring to FIG. 1c, wherein like reference numbers refer to like components in FIGS. 1a–1b, the outer member 10 is shown positioned adjacent to the outer face 54 of the inner member 42. As depicted in FIG. 1c, the outer face 54 of the inner member 42 is sufficiently contiguous and coextensive with the outer member 10 such that the outer member 42 substantially covers the inner member 42. As depicted in FIG. 1c, the outer member 10 is matable with the inner member 42. "Matable" means that the outer member 10 and the inner member 42 are configured to fit together in a functional manner (i.e., such that they may function as an assembly serving as a vehicle roof and vehicle side frames).

Figure 2A:
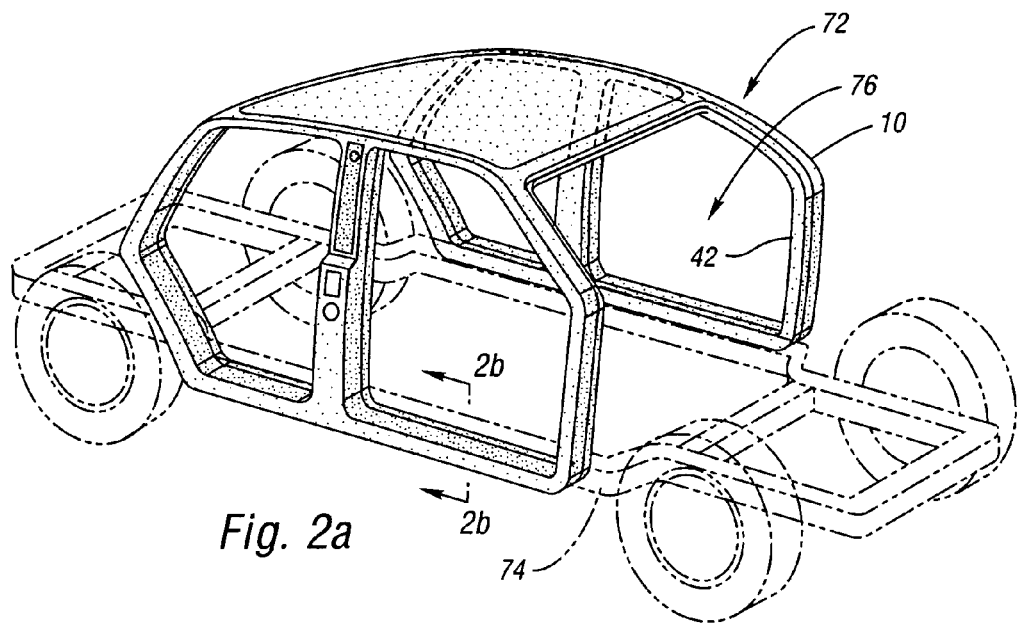
FIG. 2a is a schematic illustration in perspective view of a body and frame assembly connected to a vehicle chassis frame, including the outer member of FIG. 1a joined to the inner member of FIG. 1b.

Referring to FIG. 2a, wherein like reference numbers refer to like components in FIGS. 1a–1c, a body and frame assembly 72 including outer member 10 joined to inner member 42 is depicted. The body and frame assembly 72 may be two-piece, integral or unitary. The body and frame assembly 72 is mounted to a vehicle chassis 74 (shown with dashed lines) to at least partially define a vehicle passenger compartment 76. Thus, the vehicle roof panel and side frame portions of the vehicle are formed by the body and frame assembly.

Figure 2B:
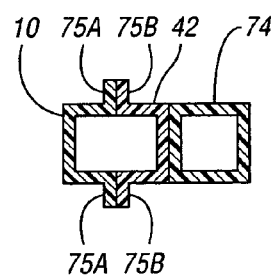

Referring to FIG. 2b, a vertical cross-sectional view, taken at the arrows shown in FIG. 2a, of the body and frame assembly 72 mounted to the vehicle chassis 74 is depicted. The outer member 10 forms an inwardly facing channel shape. The inner member 42 forms an outwardly facing channel shape. The outer member 10 and the inner member 42 may both be formed with flanges 75A, 75B, respectively, at the upper and lower ends thereof. The flanges 75A, 75B are not shown in FIGS. 1a–2a. The flanges 75A, 75B may extend along the abuttable surfaces of the pillar portions 21, 56 and the rockers 36A, 36B, 58A and 58B. The flanges 75A, 75B may also extend along each of the four sides of the inner and outer roof panel portions 12, 44. The invention contemplates other arrangements and locations for such flanges 75A, 75B.

Figure 3:
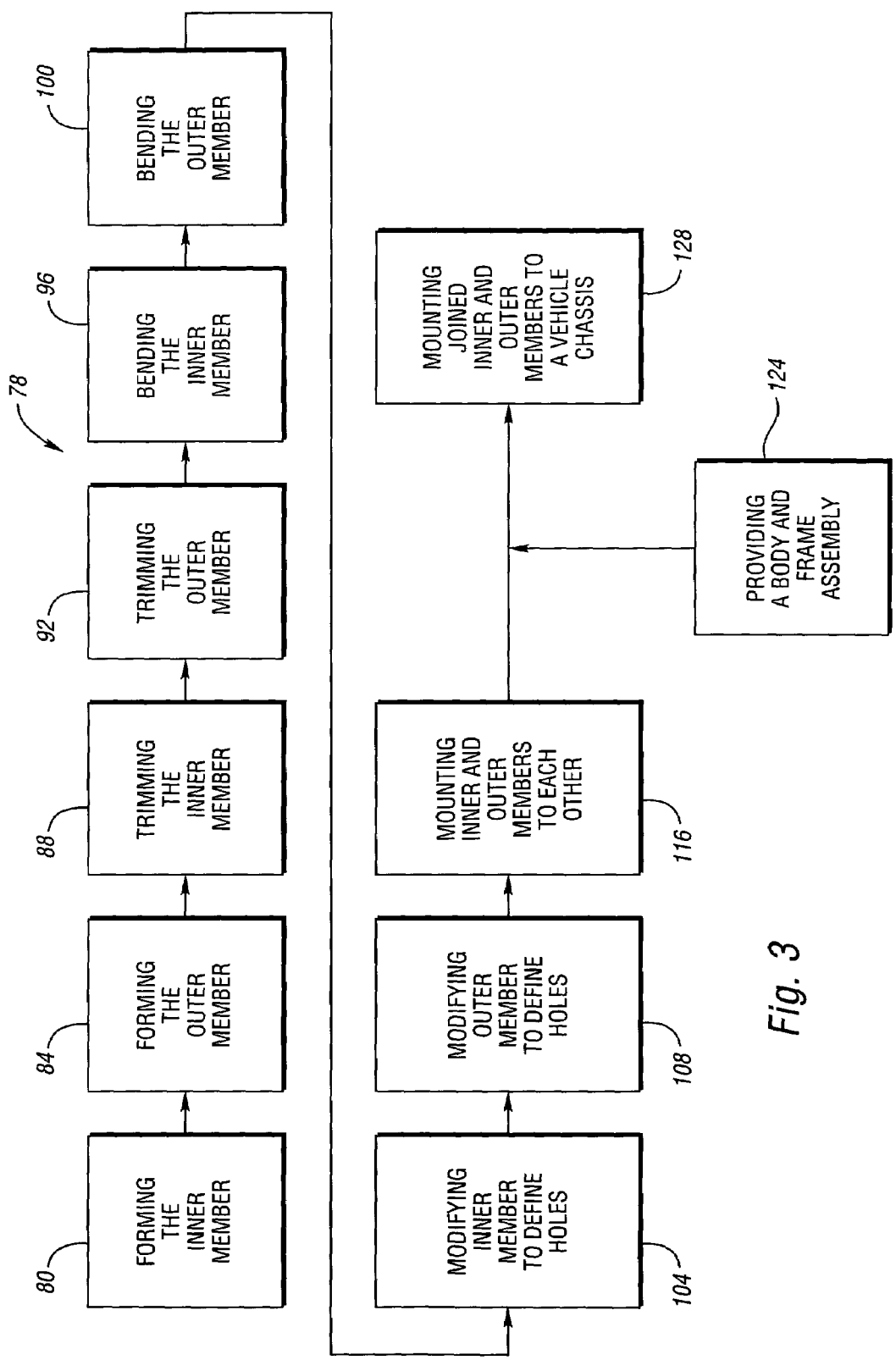
FIG. 3 is a flow diagram illustrating a method of assembling a vehicle that includes the body and frame assembly of FIG. 2a, in accordance with the invention.

FIG. 3 is a flow chart depicting a method of assembling a vehicle 78 that includes a body and frame assembly such as that shown in FIG. 2a. The method 78 may include forming 80 the inner member 42 by quick plastic forming, super plastic forming or hydroforming. The method 78 may further include forming 84 the outer member 10 by quick plastic forming, super plastic forming or hydroforming. The invention contemplates that the outer and the inner members 10, 42 may each be formed from a single separate rigid sheet. Preferably, the sheets are aluminum. Forming may be by a quick-plastic forming method, a super-plastic forming method or a hydroforming method. Quick plastic forming is described in U.S. Pat. No. 6,253,588, issued Jul. 3, 2001 to Rashid, et al and assigned to General Motors Corp., which is hereby incorporated by reference in its entirety. Super-plastic forming is described in U.S. Pat. No. 5,974,847, issued Nov. 2, 1999 to Saunders, et al and assigned to General Motors Corp., which is hereby incorporated by reference in its entirety. Hydroforming is also a feasible method of forming vehicle body panels and frame sections.

Referring to FIG. 3, the method 78 may further include trimming the inner member 88 and trimming the outer member 92. Trimming 88, 92 would remove excess sheet material to further define the desired shape of the inner member 42 and of the outer member 10, respectively. Trimming may be accomplished by mechanical cutting or by laser cutting. A variety of other trimming methods may be readily apparent to those skilled in the art.

The method 78 may further include bending the inner member 96 such that the inner side frame portions 50, 52 extend generally downward from the inner roof panel portion 44 as depicted in FIG. 1b. The method 78 may further include bending the outer member 100 such that the first outer side frame portion 18 and the second outer side frame portion 20 extend generally downward from the outer roof panel portion 12 as depicted in FIG. 1a. Bending may be accomplished by a press bend machine. Multiple bending cycles may be employed in order to obtain the desired shape. Additionally, those skilled in the art will recognize a variety of other techniques for bending the outer member 10 and the inner member 42.

The method 78 may further include modifying the inner member to define holes 104 and modifying the outer member to define holes 108. Modifying to define holes 104, 108 may include laser cutting or mechanically cutting holes for door hinges, wiring or trim components. A variety of techniques for cutting such holes will be recognized by those skilled in the art.

The method 78 may further include mounting the inner member to the outer member 116 such that the outer member 10 substantially covers the inner member 42 and the outer member 10 and the inner member 42 are joined as an assembly, as depicted in FIG. 2a. Mounting may be accomplished by hemming, welding or bonding, or a combination of these techniques, within the scope of the method 78. Preferably, the abutting flanges 75A, 75B on the inner member 42 and outer member 10 depicted in FIG. 2b would be laser welded together. Those skilled in the art will recognize these techniques as well as a variety of other techniques for mounting the inner and the outer members, 42, 10, respectively. The invention contemplates that bending 96, 100 the inner member 42 and the outer member 10, respectively may occur either prior to after mounting 116.

The method 78 may further include providing 124 a body and frame assembly such as body and frame assembly 72 depicted in FIG. 2a (i.e., a pre-assembled body and frame assembly that has an inner member and an outer member). The method 78 may further include mounting the joined inner and outer members 128 to a vehicle chassis to at least partially define a vehicle passenger compartment, as depicted in FIG. 2a. Mounting 128 may be accomplished by a variety of techniques including spot welding, laser welding, hemming, fastening, and adhesive bonding. With respect to the cross-section depicted in FIG. 2b, the inner member 42 could be laser welded to the chassis 74. Those skilled in the art will recognize a variety of techniques for mounting the body and frame assembly to the chassis.

While the best mode for carrying out the invention has been described in detail, those familiar with the art to which this invention relates will recognize various alternative designs and embodiments for practicing the invention within the scope of the appended claims.

The invention claimed is:

1. A body and frame assembly for a vehicle comprising a one-piece inner member mated with a one-piece outer member, said inner member defining door openings at opposing sides of the vehicle and said outer member further defining said door openings at said opposing sides of said vehicle; wherein said inner member and said outer member are metal; and wherein said inner member and said outer member each include at least one portion selected from the group consisting of a B-pillar, a body lock pillar, a front hinge pillar and a rocker panel portion.

2. A body and frame assembly for a vehicle comprising a one-piece inner member mated with a one-piece outer member, said inner member defining door openings at opposing sides of the vehicle and said outer member further defining said door openings at said opposing sides of said vehicle; wherein said inner member and said outer member are metal; wherein the inner member includes an inner roof panel portion having opposite ends respectively at said opposing sides, a first inner side frame portion at one end and a second inner side frame portion at the opposed end, wherein said inner side frame portions extend generally downward from the inner roof panel portion;

wherein the outer member includes an outer roof panel portion having opposite ends respectively at said opposing sides, a first outer side frame portion at one end and a second outer side frame portion at the opposed end, wherein said outer side frame portions extend generally downward from the outer roof panel portion;

wherein said first inner and first outer side frame portions substantially define at least one door opening and said second inner and second outer side frame portions substantially define at least one other door opening;

wherein the inner and outer side frame portions each include a plurality of pillar portions and rocker portions, wherein the pillar portions are disposed between and connect the roof panel portions and the rocker portions; and wherein the inner member and the outer member are joined as an assembly.

3. The body and frame assembly of claim 2, wherein said first inner and first outer side frame portions substantially define at least two door openings and said second inner and second outer side frame portions substantially define at least two other door openings.

4. The body and frame assembly of claim 2, wherein each of the inner and the outer side frame portions forms a door ring having an unbroken ring shape.

5. The body and frame assembly of claim 2, wherein the plurality of pillar portions includes at least one of an A-pillar, B-pillar and a C-pillar.

6. The body frame and assembly of claim 2, wherein the inner roof panel is characterized by formations configured to provide structural rigidity.

7. The body and frame assembly of claim 1, wherein the inner and outer members define holes for at least one of door hinges, wiring and trim components.

8. The body and frame assembly of claim 1, wherein the inner member is formed from a single first rigid sheet and the outer member is formed from a single second rigid sheet.

9. The body and frame assembly of claim 8, wherein said first and second sheets are aluminum.

10. The body and frame assembly of claim 1, wherein at least one of the inner member and outer member is formed by quick plastic forming.

11. The body and frame assembly of claim 1, wherein at least one of the inner member and the outer member is formed by super plastic forming.

12. The body and frame assembly of claim 1, wherein at least one of the inner member and the outer member is formed by sheet hydroforming.

13. The body and frame assembly of claim 1, wherein the inner member and the outer member are joined at least partially by hemming.

14. The body and frame assembly of claim 1, wherein the inner member and the outer member are joined at least partially by welding.

15. The body and frame assembly of claim 1, wherein the inner member and the outer member are joined at least partially by bonding.

16. The body and frame assembly of claim 1, wherein the inner member and the outer member are aluminum.

17. The body and frame assembly of claim 1, wherein the inner member has an outer face and the inner member and the outer member are sufficiently contiguous and coextensive with each other such that the outer member substantially covers the outer face of the inner member.

18. A body and frame assembly for a vehicle comprising:

an integral inner member including an inner roof panel portion having opposite ends respectively at opposing sides of said vehicle, a first inner side frame portion at one end and a second inner side frame portion at the opposed end, wherein said inner side frame portions extend generally downward from the inner roof panel portion; and an integral outer member matable with the inner member including an outer roof panel portion having opposite ends respectively at said opposing sides of said vehicle, a first outer side frame portion at one end and a second outer side frame portion at the opposed end, wherein said outer side frame portions extend generally downward from the outer roof panel portion;

wherein said first inner and first outer side frame portions substantially define at least one door opening and said second inner and second outer side frame portions substantially define at least one other door opening; wherein said inner member and said outer member each include at least one portion selected from the group consisting of a B-pillar, a body lock pillar, a front hinge pillar and a rocker panel portion; and wherein the inner member and the outer member are joined as an assembly.

19. A method of assembling a vehicle, the method comprising:

forming a one-piece inner member;

forming a one-piece outer member matable with the inner member;

after said forming a one-piece inner member, bending the inner member;

after said forming a one-piece outer member bending the outer member; and mounting the inner and outer members to each other such that the inner member defines door openings at opposing sides of the vehicle and the outer members further defines said door openings at said opposing sides of the vehicle; and wherein said forming steps are by a method selected from the group consisting of quick plastic forming, super plastic forming and hydroforming.

20. The method of assembling a vehicle of claim 19, wherein the inner member includes an inner roof panel portion having opposite ends, a first inner side frame portion at one end and a second inner side frame portion at the opposed end;

wherein the outer member includes an outer roof panel portion having opposite ends respectively at said opposing sides, a first outer side frame portion at one end and a second outer side frame portion at the opposed end; and wherein said bending the inner member is such that the inner side frame portions extend generally downward from the inner roof panel portion; and wherein said bending the outer member is such that the outer side frame portions extend generally downward from the outer roof panel portion.

21. The method of claim 19, wherein said mounting is such that the outer member substantially covers the inner member and the inner member and the outer member are joined as an assembly.

22. The method of claim 19, further comprising trimming the inner member.

23. The method of claim 19, further comprising trimming the outer member.

24. The method of claim 19, further comprising modifying the inner member such that it defines holes for door hinges, wiring and trim components other than doors.

25. The method of claim 19, further comprising modifying the outer member such that it defines holes for door hinges, wiring and trim components other than doors.

26. The method of claim 19, further comprising mounting the joined inner and outer members to a vehicle chassis to at least partially define a vehicle passenger compartment.

27. The method of claim 19, further comprising:

providing a body and frame assembly including the mounted inner and outer members.

* * * * *